(12) United States Patent
White (10) Patent No.: US 7,676,396 B1
(45) Date of Patent: Mar. 9, 2010

(54) SELECTIVE OMISSION OF TRANSACTION DATA IN A DIGITAL RECEIPT

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 1133 days.

(21) Appl. No.: 09/678,885

(22) Filed: Oct. 3, 2000

(51) Int. Cl.
*G06Q 30/00* (2006.01)
*G06K 15/55* (2006.01)

(52) U.S. Cl. .......................... 705/24; 705/26; 705/705; 235/379; 235/380; 235/383; 709/203; 709/219

(58) Field of Classification Search ................ 705/24, 705/16, 17, 26, 75; 235/375, 376, 379, 380, 235/383; 709/203, 217, 219, 223
See application file for complete search history.

(56) References Cited

U.S. PATENT DOCUMENTS

| | | | | |
|---|---|---|---|---|
| 4,707,592 A | * | 11/1987 | Ware | 235/379 |
| 4,739,295 A | * | 4/1988 | Hayashi et al. | 235/379 |
| 5,010,485 A | * | 4/1991 | Bigari | 705/17 |
| 5,712,914 A | * | 1/1998 | Aucsmith et al. | 380/30 |
| 5,739,512 A | | 4/1998 | Tognazzini | |
| 5,838,798 A | * | 11/1998 | Stevens, III | 705/21 |
| 5,903,880 A | | 5/1999 | Biffar | |
| 5,915,022 A | * | 6/1999 | Robinson et al. | 705/75 |
| 6,047,269 A | | 4/2000 | Biffar | |
| 6,058,375 A | * | 5/2000 | Park | 705/30 |
| 6,067,529 A | * | 5/2000 | Ray et al. | 705/26 |
| 6,102,287 A | * | 8/2000 | Matyas, Jr. | 235/380 |
| 6,179,206 B1 | * | 1/2001 | Matsumori | 235/383 |
| 6,279,112 B1 | * | 8/2001 | O'Toole et al. | 713/201 |
| 6,460,163 B1 | * | 10/2002 | Bowman et al. | 714/819 |
| 6,546,373 B1 | * | 4/2003 | Cerra | 705/19 |
| 6,676,016 B1 | * | 1/2004 | Coskrey, IV | 235/380 |
| 6,678,664 B1 | * | 1/2004 | Ganesan | 705/39 |
| 6,726,094 B1 | * | 4/2004 | Rantze et al. | 235/379 |
| 6,845,363 B1 | * | 1/2005 | Matsubara et al. | 705/16 |
| 7,158,948 B1 | * | 1/2007 | Rodriguez et al. | 705/28 |
| 7,167,844 B1 | * | 1/2007 | Leong et al. | 705/80 |

OTHER PUBLICATIONS

PR Newswire, "Hanwha Selects ValiCert B2B Express Solution to Enable Secure Global Online Commerce", New York, Jun. 28, 2000, 3 pages.*

Ludwig Huber, "Implementing 21 CFR Part 11 in analytical laboratories: Part 1: Overview and requirements", Biopharm, Cleveland, Nov. 1999, six pages, see p. 3.*

* cited by examiner

*Primary Examiner*—Andrew Joseph Rudy
(74) *Attorney, Agent, or Firm*—Maginot, Moore & Beck LLP; Paul W. Martin (57) ABSTRACT

A digital receipt (e-receipt) having various transaction data that is generated after a consumer transaction by a retail terminal or via a public or private electronic network may be forwarded to the consumer or third party with selective transaction data omitted from the digital receipt. The digital receipt is forwarded to the consumer either directly from the point of the transaction or indirectly via a data warehouse, clearing center or the like.

6 Claims, 7 Drawing Sheets

Store, Inc.
Purchase Transaction Record
May 15, 2000
4:23 PM

Store #: 123
555 Main Street
Anywhere, USA ph. (123) 555-1234
fax (123) 555-2345

| QTY | Item(s) Purchased | Unit Price | Cost | UPC # |
|---|---|---|---|---|
| 1 | Item A | $ 3.99 | $ 3.99 | 6050705 |
| 2 | Item B | $ 2.75 | $ 5.50 | 3458909 |
| 3 | Item C | $ 0.53 | $ 1.59 | 9876354 |
| 4 | Item D | $ 2.49 | $ 9.96 | 0131990 |

Total Items Purchased: 10    Items Cost: $ 21.04
                             Sales Tax   $ 1.16  (@ 5.5%)
                             Total Cost: $ 22.20

Type of Payment: Cash    Amount Tendered: $25.00
                         Change Due: $ 2.80

Customer Name: Joe Smith
Address:            555 Jones Street
                    Anywhere, USA
E-mail:             joe.smith@anywhere.net
Customer Loyalty ID#: 1234567890

--------------------------------------------------------

ATTACHMENT.XYZ

SELECTIVE OMISSION OF TRANSACTION DATA IN A DIGITAL RECEIPT

CROSS-REFERENCE TO RELATED APPLICATIONS

This application is related to the following co-pending and commonly assigned patent applications: "Digital Receipt Transaction Receipt Having an Attachment Correlated to a Purchased Item" filed on the same date herewith by Daniel F. White, Dale R. Lyons, and James D. Greene, Ser. No. 09/678,590; "Digital Purchase Transaction Receipt Having an Attachment Correlated to a Payment Method" filed on the same date herewith by Tracy L. Flynn, James D. Greene, and Daniel F. White, Ser. No. 09/678,036; "Digital Purchase Transaction Receipt Having a Multi-Media Attachment" filed on the same date herewith by James D. Greene, Ser. No. 09/679,190; "Forwarding of Selective Transaction Data From a Digital Receipt to a Non-Party to the Transaction" filed on the same date herewith by Tracy L. Flynn, Ser. No. 09/679,188; "Scheduled Forwarding of a Digital Receipt" filed on the same date herewith by Dale R. Lyons, Ser. No. 09/678,884; "Collection of Transaction Data From Digital Receipts Generated by a Plurality of Businesses" filed on the same date herewith by Daniel F. White, Ser. No. 09/678,350; and "Digital Receipt with an Embedded Identifier" filed on the same date herewith by Daniel F. White and Mark S. Hoffman, Ser. No. 09/678,886.

Cross-reference is also made to U.S. patent application Ser. No. 09/099,659 entitled "System and Method for Transmitting and Journalizing a Retail Transaction", filed on Jun. 17, 1998.

FIELD OF THE INVENTION

The present invention relates generally to electronic transactions typically conducted in an environment of networked electronic devices and, more particularly, to electronic purchase receipts associated with electronic purchase transactions conducted in an environment of networked electronic devices, particularly computers.

DESCRIPTION OF THE PRIOR ART

Retail and services businesses and other consumer transaction establishments (collectively "businesses") today provide customers a printed or paper receipt of their transaction. The information on the printed receipt typically contains the name of the store, the date of the transaction, the items purchased, the price of each item purchased, the total purchase amount, the amount paid by the customer, the manner of payment, and the change given, if any. While this information is generally retained electronically by the business it is not provided to the customer (i.e. purchaser) in electronic form. If the customer pays with a credit or debit card, or a check, the customer will receive a printed receipt and as well will receive a statement from the credit card company or bank, while the business will typically retain the information electronically. Again, however, the customer will not receive the information in electronic form.

In certain situations it is desirable to track expenses and/or purchases that are incurred. The need to track expenses arises in business situations particularly when the business person is traveling. The business person is forced to retain and carry paper receipts. These paper items, including hotel, restaurant and rental car receipts are bulky, easily lost or misplaced, and often difficult to read days or weeks after they were issued to the business person. As well, the business traveler may accumulate a substantial number of printed receipts over the course of a business trip. In addition to making sure that all of the receipts are retained, the business person or an assistant will also be faced with the time-consuming task or organizing, categorizing, and transcribing the amounts into an expense report. The arduous task of completing the expense report including reconciling the expense report with the printed receipts costs companies many dollars in overhead for the time spent accomplishing the task.

The above-noted problems with printed receipts have been recognized by the industry. In trying to address these problems, printed receipts and statements may group or categorize the various expenses on the printed receipt and even provide subtotals for the various categories. While such categorization does permit more easy completion of an expense report, it does not address the retention or bulkiness problems. Another manner of addressing the problem is to mail the receipt to the customer. This, however, does not solve the retention or bulkiness problems, and may actually create problems such as losing the receipt or delaying delivery thereof.

The above remedies are unfortunately merely attempts to either get a printed receipt to the business person or customer more quickly or conveniently, or to aid the completion of expense reports or the like. They do not address the problems inherent in printed or paper receipts.

In order to alleviate the above-noted problems of printed receipts, electronic or digital receipts provide a solution to at least some of the problems. An electronic receipt, generated by a business, may be generated and stored by the business and then delivered via electronic mail to the customer/purchaser. Electronic mail, using either a public or open network such as the Internet, or a proprietary network, is a simple means of communicating digital information from one location to another location.

In U.S. Pat. No. 5,739,512 entitled Digital Delivery of Receipts, issued on Apr. 14, 1998 to Tognazzini, there is disclosed a system that that stores or transmits receipt information digitally for later use. The receipt information may be delivered over a proprietary or an open network such as the Internet to an e-mail address. The e-mail address is embedded into a bank card or other machine readable card that is used for the purchase.

Even though the Tognazzini patent discloses a system that can generate and send an electronic receipt to a customer, such delivery of an electronic receipt does not provide further value to either the customer or retailer other than the compilation of data inherent in an electronic receipt, the quick delivery thereof, and the convenience of electronic retention.

What is therefore needed is a system that can provide an electronic receipt with value added features.

What is therefore further needed is a system that can provide an electronic receipt of a purchase transaction with value added features for the customer and/or the retailer.

What is therefore even further needed is a system that can provide an electronic receipt of a purchase transaction and allow flexibility in forwarding the electronic receipt and/or data therefrom.

What is therefore yet further needed is a system that can provide an electronic receipt of a purchase transaction wherein the data generated from the purchase transaction may be selectively disseminated.

SUMMARY OF THE INVENTION

The present invention is a system for generating an electronic receipt and allowing the selective omission of transaction data therefrom before transmission of the electronic receipt over an electronic network.

In one form, the present invention is a method of processing a purchase transaction. The method includes the steps of: a) acquiring purchase transaction data as a result of the purchase transaction; b) formatting the purchase transaction data into a digital purchase transaction record; c) allowing omission of purchase transaction datum of the purchase transaction data from the digital purchase transaction record by a party to the purchase transaction to obtain a personalized digital purchase transaction receipt; and d) transmitting the personalized digital purchase transaction receipt over a network.

In another form, the present invention is a method of processing a purchase transaction. The method includes the steps of: a) acquiring purchase transaction data as a result of the purchase transaction; b) permitting a party to the purchase transaction to omit certain purchase transaction datum of the purchase transaction data to obtain a modified purchase transaction record; c) formatting the modified purchase transaction record into a digital transaction receipt; and d) transmitting the digital transaction receipt over a network.

In yet another form, the present invention is a system for processing a purchase transaction. The system includes an input in communication with a network, a processing unit in communication with the input; and memory in communication with the processing unit. The memory stores a plurality of instructions which, when executed by the processing unit, causes the processing unit to: a) acquire purchase transaction data on the input during the purchase transaction; b) format the purchase transaction data into a digital purchase transaction record; c) permit omission of purchase transaction datum of the purchase transaction data from the digital purchase transaction record by a party to the purchase transaction to obtain a personalized digital purchase transaction receipt; and d) transmit the personalized digital purchase transaction receipt over the network.

In still another form, the present invention is a system for processing a purchase transaction. The system includes an input in communication with a network, a processing unit in communication with the input, and memory in communication with the processing unit. The memory stores a plurality of instructions which, when executed by the processing unit, causes the processing unit to: a) acquire purchase transaction data on the input in response to the purchase transaction; b) permit a party to the purchase transaction to omit certain purchase transaction datum of the purchase transaction data to obtain a modified purchase transaction record; c) format the modified purchase transaction record into a digital purchase transaction receipt; and d) transmit the digital purchase transaction receipt over the network.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates a preferred embodiment of the invention, in one form, and such exemplification is not to be construed as limiting the scope of the invention in any manner.

DETAILED DESCRIPTION

Figure 1:
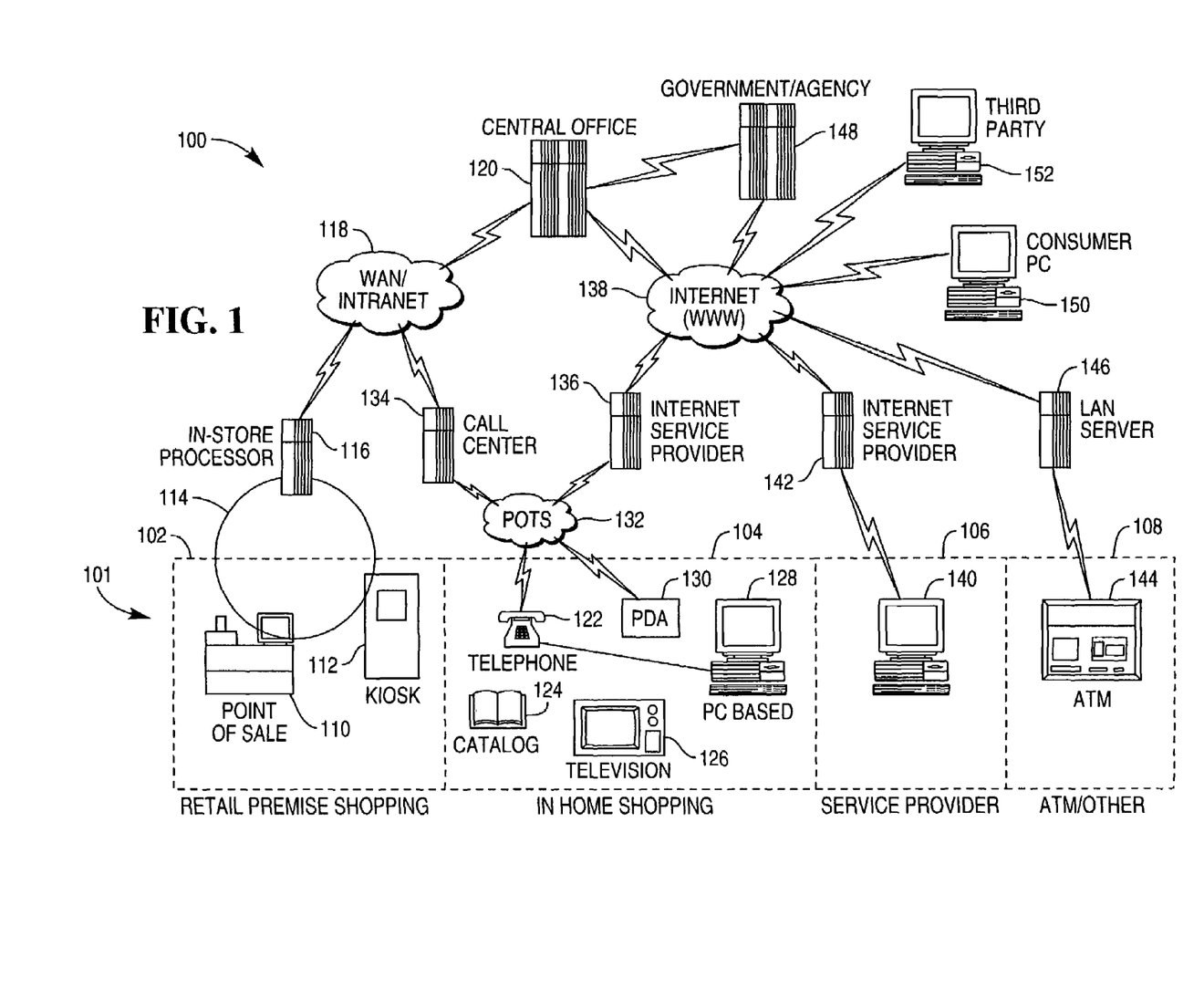
FIG. 1 is a block diagram of a system for implementing the principles of the present invention.

Referring now to FIG. 1, there is depicted a diagram, generally designated 100, of an overall system that is able implement the various aspects and/or principles of the present invention. It should initially be understood that the system 100 as depicted in FIG. 1 is representative or exemplary of the many ways and facets in which the various aspects and/or principles of the present invention may be employed. Thus, the system 100 is not intended to be an exact representation of any particular system nor is it intended to imply that only this type of system may implement the various aspects and/or principles of the present invention. The system 100 as shown in FIG. 1 provides a basic model for understanding the various aspects and/or principles of the present invention, the various forms through which the various aspects and/or principles of the present invention may be manifested, and the many ways in which the various aspects and/or principles of the present invention may be carried out.

A purchase transaction transpires whenever a person or entity transfers money (or something of value) for goods or services. The purchase transaction can be characterized by a plurality of purchase transaction datum (i.e. transaction data or purchase transaction data). The purchase transaction data is composed of fundamental pieces of datum regarding the purchase transaction such as what was purchased, where it was purchased, who purchased it, how much it cost, how many were purchased, in what manner was payment tendered, when did the transaction take place, etc. This type of data is obtained and/or generated during a purchase transaction by a variety of purchase transaction devices from a simple cash register to automatic electronic transaction terminals. As well, this type of data is obtained and/or generated during a purchase transaction by a variety of network-linked transaction devices such as between a personal digital assistant (PDA) and a network server.

Detailed purchase transaction data is thus generated by a variety of devices in a variety of situations. In FIG. 1, a system or architecture for obtaining/generating purchase transaction data, appropriately formatting the purchase transaction data for electronic storage and/or transmission over a network and storing disseminating the purchase transaction data received from a variety of sources to a variety of destinations in accordance with the principles of the present invention is shown, generally designated 101. Purchase transaction data encompasses retail/wholesale purchase transaction data, business services or business transaction data, and/or other types of transaction data and the like. Purchase transaction data may be defined, without being limiting, as data generated when a consumer or business purchases a product or service. Typically, the purchase transaction data is generated/obtained by the merchant selling and/or providing the product or service. Business transaction data may be defined, without being limiting, as data generated by a business transaction such as banking, brokering, and/or the like either by a consumer or business. The amount and type of data generated in all cases varies from situation to situation, but generally includes basic information regarding the transaction as described above and known in the art. Herein, purchase transaction data encompasses all types of transaction data. As well, the terms purchase transaction data and transaction data are essentially synonymous except where specifically indicated otherwise.

One situation that generates purchase transaction data is from retail (including and encompassing wholesale) premises shopping 102. Retail premises shopping 102 includes, without being limiting, grocery store shopping, department store shopping, wholesale club and all other types of on-site/premise store shopping. A point-of-sale (POS) device 110 may be used by the store 102 to conduct the purchase transaction and thus generate/obtain purchase transaction data. Point-of-sale devices can exist in many forms. A currently typical point-of-sale device 110 is an electronic cash register. The electronic cash register typically includes a scanner, keyboard, display, processing unit, and other known components. The cash register 110 may take many electronic forms as well as mechanical forms. The cash register may be operated-assisted, user-assisted or essentially fully automatic.

Another point-of-sale device is known as a kiosk 112. The kiosk 112 is typically a stand-alone device that includes the many features and components of a cash register, but which is generally consumer usable/operated devices. Such kiosks 112 are generally interspersed throughout a store. Kiosks 112, however, may not be associated with a particular store/building and thus placed in various locations. The cash register 110, the kiosk 112, and other similar-function devices may be collectively termed "retail terminals." Such retail terminals may be clerk-assisted or unassisted (i.e. consumer operated) devices.

The retail terminals 110 and 112 are shown connected by a network 114 to a local or in-store processor 116, as is usually the case. It should be appreciated that a plurality of various types or the same type of retail terminals may be in communication with the network 114; the cash register 110 and the kiosk 112 being only exemplary.

The in-store processor 116 is typically a computer that stores and executes a variety of programs/instructions to allow the network and its components, including the retail terminals, to function. As such, the in-store processor 116 has storage and processing capabilities for including various databases or arrays for storing product data and/or consumer data, and for networking and formatting, if necessary, transaction data. The databases may be used for various purposes as are known in the art. As an example, a database may be used as a product look-up table during product scanning, while a database may be used to store customer information for shopping habits, frequent shopping lists, etc., acquired through purchase.

In accordance with an aspect of the present invention, the retail terminals assist in the collection and generation of transaction data (if not completely generate/obtain transaction data) that is produced as part of the purchase transaction. As well, the various retail terminals accept payment for the goods in whatever form (i.e. cash, credit, debit, check, money order, etc.) through payment acceptor units as are known in the art such as, cash acceptors, magnetic strip readers (MSRs), smart card readers, and the like. The retail terminals may also perform formatting of the transaction data into various forms depending on the relationship/role of the retail terminal (110, 112) to/with the in-store processor 116. The retail terminal typically processes the transaction data into an electronic or digital form (e.g. an electronic or digital purchase transaction record) for transmission over the network 114 to the in-store processor 116. The in-store processor 116 may assemble the purchase transaction record into an electronic or digital purchase transaction receipt.

Value may be added to the digital receipt by the addition of supplementary material, explained further below. This may be accomplished by the retail terminal, the in-store processor, or a combination of both. The retail terminal may alternatively perform the functions described above as attributed to the in-store processor 116, in which case the in-store processor 116 may then serve to collect the digital receipts. This would be in addition to other functions.

Briefly, in accordance with an aspect of the present invention, an attachment (i.e. supplementary material) is correlated to various transaction datum of the purchase transaction and appended to or made a part of the electronic or digital receipt. The digital receipt with the supplementary material is then transmitted over the network to a party to the purchase transaction (i.e. the purchaser or consumer, or a database of data warehouse of the retailer/merchant). This function may be accomplished by the retail terminal (110, 112), the in-store processor 116, the central office 120, or any combination thereof. Correlation processing instruction and the supplementary material likewise may be store on the retail terminal (110, 112), the in-store processor 116, the central office 120, or any combination thereof.

As well other processing, formatting, transmitting and the like of the transaction data resulting from a purchase transaction may be accomplished by any combination or separately, of the retail terminal, the in-store processor, or the central office.

The in-store processor 116, however, typically collects and/or consolidates the transaction data or record from the various retail terminals and stores the transaction data in at least one of its databases. The in-store processor 116 also provides a gateway to a wide area network 118 or the like. The key interface for this gateway is the retailer's central office processor/computer 120. The central office 120 may provide consolidation of store level data for management review as well as providing a gateway for the store to common credit/debit authorization networks. The central office 120 may be a database or data warehouse for the digital receipts generated by the various retail terminals, both those maintained by the merchant/owner of the central office 120 and those of other merchants. As well, the central office 120 may be independent of a merchant, but still serve in the same capacity as described above.

Figure 2:
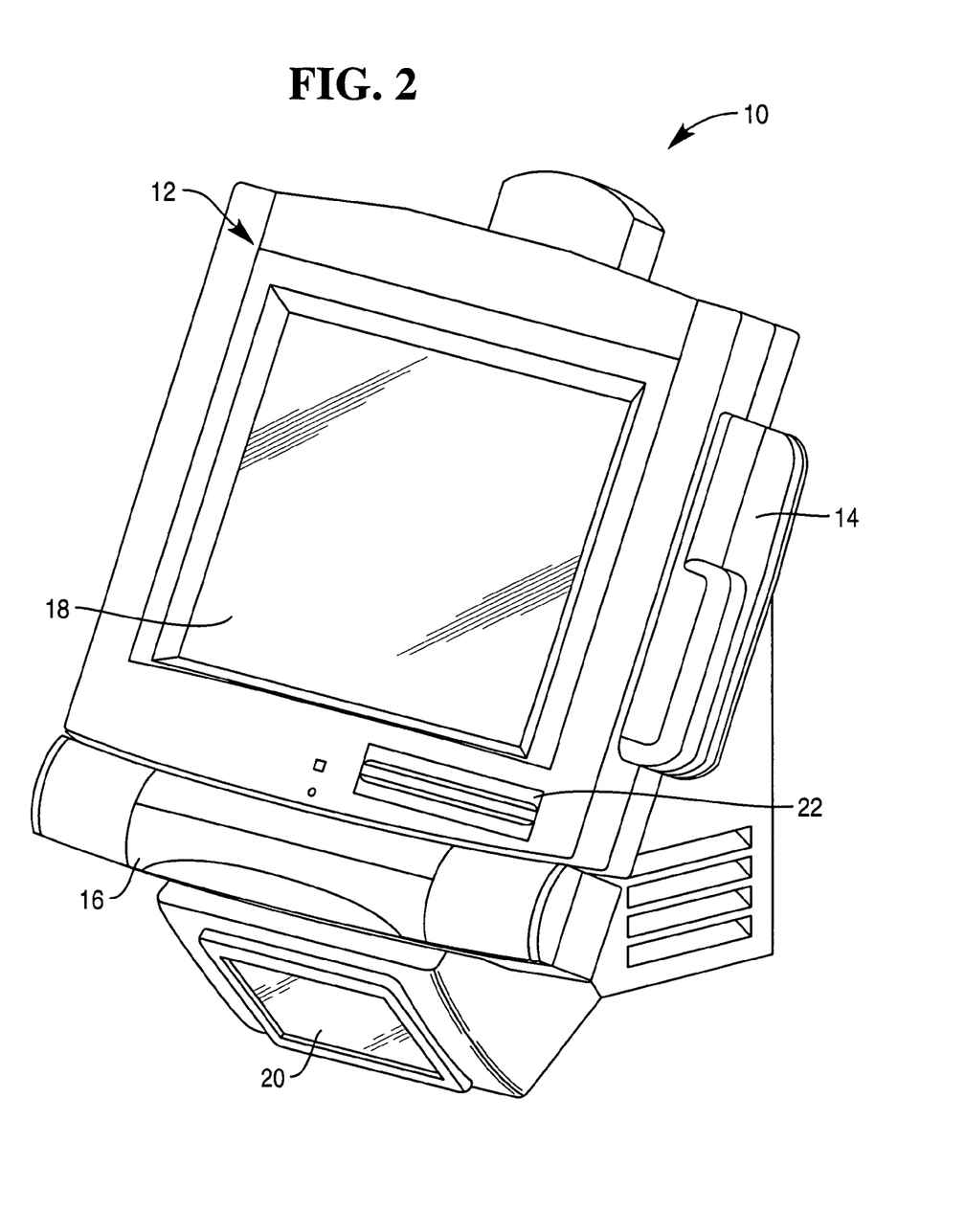
FIG. 2 is a representation of a retail terminal that may be utilized to generate and/or process an electronic receipt in accordance with the principles of the present invention.

With reference now to FIG. 2, there is shown a retail terminal generally designated 10 that is representative of any retail terminal such as the POS terminal 110 and the kiosk 112. The retail terminal 10 may be configured into what is known as a kiosk, or may be any type of similar retail terminal as is known in the art. It should be appreciated that the retail terminal 10 may be mounted to a post or other structure, rest upon a table or similar surface, or be incorporated into any other type of construction. The retail terminal 10 may be of a consumer interactive type but not necessarily so. As such, the retail terminal 10 may be configured to perform a number of retail functions such as (i) a point-of-sale (POS) retail function, (ii) a product demonstration retail function, (iii) a data collection function, (iv) a passive display function, (v) an interactive, consumer query and answer function, and/or (vi) a bill payment/application access function or the like. Hereinafter, the retail terminal 10 may be interchangeably referred to as a kiosk but consistent with the above should be understood to include all types of retail terminals and consumer interactive terminals. The retail terminal 10 may be utilized to perform assisted and/or unassisted retail/interactive functions during an active or power-up mode as well as other function modes as described herein.

The retail terminal 10 includes a housing 12 that supports a display or monitor 18 for showing video or individual frames or screens depending on the particular mode of the retail terminal 10. The display 18 preferably incorporates a touch-screen 19 (see FIG. 2) as is known in the art that overlays the display 18 and allows user interaction in conjunction with material shown on the display 18. Commonly, such displays are of the LCD type but may be any style or type. The retail terminal 10 also includes a card reader 14 as is known in the art for obtaining information from a magnetic strip type card. The card reader 14 may be a smart card reader instead of or in addition to the magnetic strip type card reader. While not shown, the retail terminal 10 may include both types of card readers. The card reader 14 is adapted to obtain various identifying and/or account information from a user's card as in the known in the art. The retail terminal 10 is adapted to accept a PIN for a card inserted into the card reader 14 via a video generated keypad shown on the display 18 in conjunction with the touch-screen 19. Other methods of obtaining a PIN, such as a mechanical keyboard as is known in the art, but not shown, may be used instead of a video generated keypad. The card reader 14 may thus be considered a payment device.

Additionally, the retail terminal 10 includes a speaker assembly 16 that is preferably a stereo speaker assembly for playing music, audio messages and/or instructions and the like. Further, the retail terminal 10 includes a scanner 20 that is positioned to allow the scanning of a bar code or the like brought in proximity thereto. The scanner 20 may be any type of scanner or imager as is known in the art that is capable of capturing or imaging a bar code, graphics or the like. Such a scanner may be a laser type scanner, an LED type scanner, combination thereof, or the like as are well known in the art.

The retail terminal 10 also includes a cash acceptor device 22 that is adapted to receive paper money in various denominations, and thus constitute another type of payment device. While not shown, a cash acceptor device that is adapted to receive coins may also be provided. The coin cash acceptor may be in addition to the paper cash acceptor 22 in order for a user to tender an exact amount of dollars and cents. With the card reader(s) 14 and the cash acceptor(s) 22 (collectively "payment devices"), the retail terminal 10 is adapted and/or configured to receive/accept payment from a user.

It should be appreciated that the retail terminal 10 shown in FIG. 1 may have other components that are not specifically mentioned herein. These other components are generally known in the art. Additionally, the retail terminal 10 may be located anywhere either as a stand-alone self-contained unit, or as coupled to a network as a networked stand-alone terminal or workstation type unit. The principles of the present invention may likewise be incorporated into an existing retail unit/system.

Figure 3:
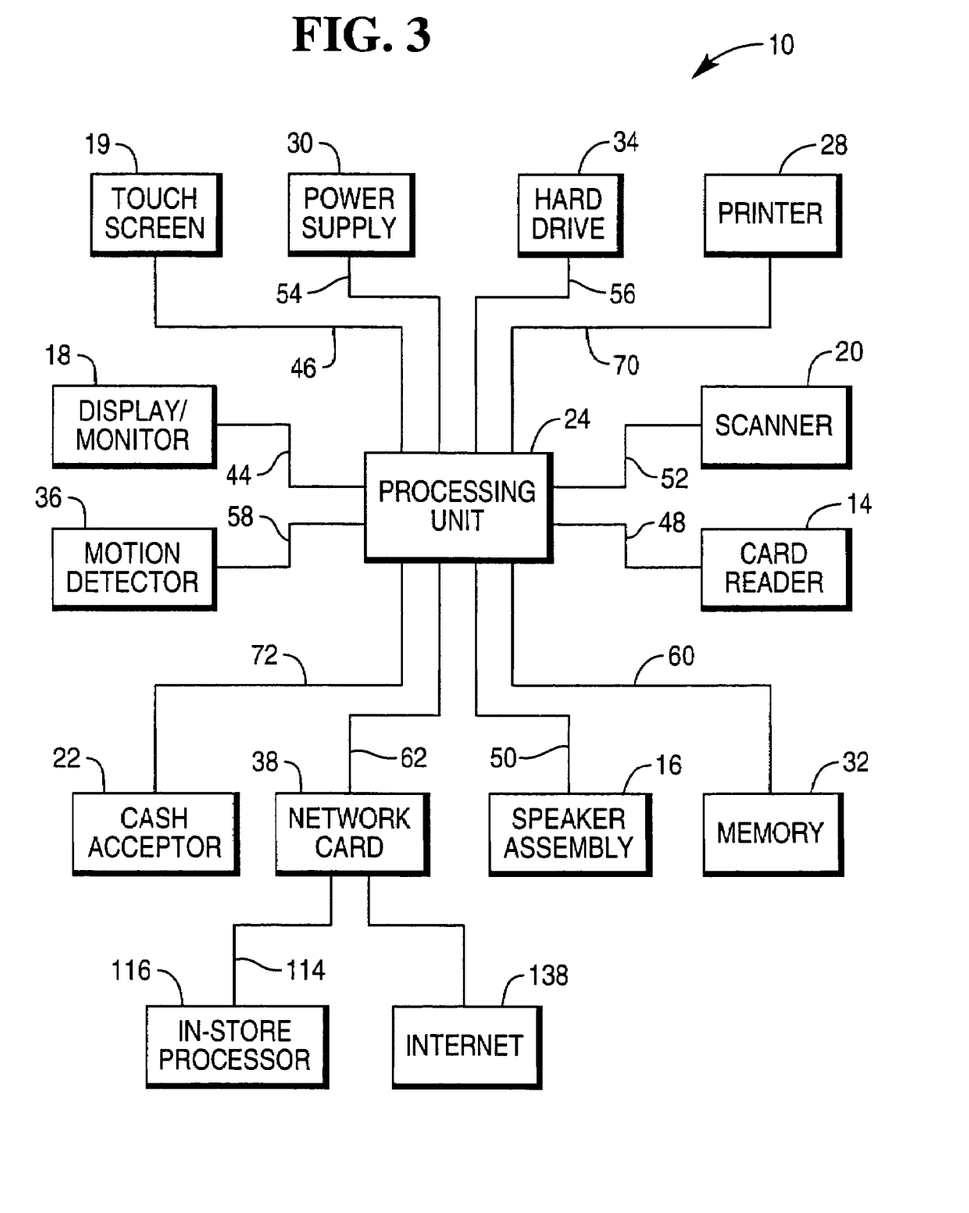
FIG. 3 is a block diagram of the various components of the retail terminal of FIG. 2.

Referring now to FIG. 3, there is depicted a block diagram of the various components of the retail terminal 10 and their interconnection(s). It should be understood that some components may be internal to the housing 12 of the retail terminal 10 and thus not shown in FIG. 1. As well, the block diagram of FIG. 3 is applicable to other types of retail terminals, kiosks, and the like.

The retail terminal 10 has a processing unit or circuitry 24 as is known in the art that includes a processor or microprocessor and associated circuitry as the main controller for or of the retail terminal 10. The processing unit 24 is in electronic communication with a typical power supply 30 via a power line 54. The power supply 30 is coupled to a source of electricity (not shown) and is transformed appropriately as is known in the art for use by the processing unit 24.

The card reader 14 is electronically coupled to the processing unit 24 via a communication line 48 that allows communication between the processing unit 24 and the card reader 14. Information from a user's card is thus obtained by the card reader 14 and used/processed by the processing unit 24. This may occur during ordering of a product and/or payment thereof, the retrieving of information. One manner of payment may be through a debit card, a charge card, a smart card, or the like (collectively "card"). Information from the card is obtained via the card reader 14.

The display 18 is electronically coupled to the processing unit 24 via a communication line 44 that allows communication between the processing unit 24 and the display 18. The display 18 is used to show various icons, graphics, windows, video, screens and/or areas (i.e. PIN entry area, billing application screen, etc.), and through the touch-screen 19 has capabilities that allow for user/consumer interaction with the retail terminal 10. The touch-screen 19 overlays the display 18 and is in electronic communication with the processing unit 24 via communication line 46 to operate in conjunction with the display 18.

Additionally, the speaker assembly 16 is also electronically coupled to the processing unit 24 via a communication line 50 that allows audio information (stereo or mono) to pass to the speakers. The audio information may be music, discourse (i.e. messages, instructions, answers to queries, or the like), or a combination of music and discourse.

Further, the scanner 20 is electronically coupled to the processing unit 24 via a communication line 52 that allows communication between the processing unit 24 and the scanner 20. The scanner 20 is adapted to obtain a scan of a bar code and/or graphics on an object in proximity thereto such as a product, label or tag having a UPC (universal product code). In order to accomplish a scan, the consumer moves the object (e.g. product) thereunder such that the bar code on the object may be read by the scanner 20. The scanner 20 is typically always in an active mode during normal operation of the retail terminal such that the bar code of an object will be immediately scanned or read when the object is placed thereunder. The scanner 20 may also read other information, coded or not, in various forms.

The retail terminal 10 may additionally include a motion detector 36 that is electronically coupled to the processing unit 24 via a communication line 58. The motion detector 36, in conjunction with the processing unit 24 and associated software, can be used to detect whether a customer is within a detection zone around the retail terminal 10 in order to allow the retail terminal 10 to perform an action or enter into a certain mode of operation.

As an example, the motion detector 36 and scanner 20 may work in tandem such that the scanner 20 is normally off when the motion detector 36 does not detect the presence of a consumer within the detection zone, but which activates the scanner 20 when a consumer is within the detection zone. After a predetermined time of inactivity, the scanner 20 may be deactivated until another triggering event has occurred (e.g. a consumer within the detection zone). As well, various types of motion of a consumer within the detection zone may trigger the scanner into activation.

The retail terminal 10 may include a hard drive 34 or other similar local or internal mass storage device that is in electronic communication with the processing unit 24 via a communication line 56. The hard drive 34 may be used to store programs or the like, and any other information that allows the retail terminal 10 and its various components to function in accordance with the principles espoused herein. The programs may be stand-alone programs for the operation of the retail terminal 10 or may be supplementary (e.g. modules) to main programs stored on the in-store processor 116 or central office server 120. The hard drive 34 may also locally store attachments and the program instructions as described below that can be correlated to various purchase transaction data which is obtained/acquired during a purchase transaction that has transpired on the retail terminal 10. Such attachments and/or program instructions may be stored on the in-store processor 116 and/or the central office server 120 rather than the individual retail terminal or kiosk.

As well, the processing unit 24 may be in communication with a memory device (or devices) 32 such as RAM or ROM via communication line 60 that may be used to temporarily or permanently store program/program instructions/modules/components and other information as is necessary for operation of the retail terminal 10. The memory 32 may also store program information (programs/instructions) for the operation of the retail terminal and its components as described herein. Other program instructions required to carry out the various functions as described herein may also be stored therein.

A network card 38, modem or the like (collectively network card) may be installed in the retail terminal 10. The network card is in electronic communication with the processing unit 24 via a communication line 62. The network card 38 allows the connection of the retail terminal 10 to the in-store processor 116 via network 114. The network card 38 also allows connection to the Internet 138 (see FIG. 1) via the in-store processor 116 through the central office 120.

The retail terminal 10 may be in electronic communication with a printer 28 via a communication line 70 for providing a printout or hard copy of information regarding a transaction or transaction data during or after a purchase transaction. The memory 32 typically temporarily stores program instructions that are executable by the processing unit 24 in order for the retail terminal 10 to process the purchase transaction. The program instructions stored in the memory 32 may allow the retail terminal 10 to accomplish the processing of the purchase transaction without the aid of program instructions stored on the in-store processor 116 or may be supplemental to program instructions stored on the in-store processor 116 or central office server 120.

Processing of the purchase transaction via the retail terminal 10 includes the ability to scan and/or receive input data regarding a product or service, obtain, produce and/or generate various transaction data regarding the purchase and generate a receipt of the transaction. The transaction receipt may be provided on paper, but in accordance with the principles of the present invention, the receipt is preferably electronic or electronically formatted such as in digital form for transmission over a network.

Referring back to FIG. 1, another type of purchasing occurs in "non-stores" (i.e. non-retail or non in-store purchasing) and collectively termed "non-store purchasing". Non-store purchasing/shopping, such as in-home shopping 104, has developed other types of POS devices and retail terminals. With catalog 124 and television 126 based in-home shopping, the telephone 122 may be the consumer's point-of-sale device, with the retail terminal which obtains and generates an electronically formatted transaction record, being a call center 134 managed by a retailer or agent thereof through a point-of-transaction service network (POTS) 132 via the intranet 118, or the central office 120 via the Internet 138. If the call center 132 generates the electronically formatted transaction record, it would then be forwarded via the network 118 to the central office 120 for storage and further formatting and transmission as discussed below. The call center 132 may be automated as through a computer or the like such that the consumer, using a touch-tone telephone, may enter information. In another form, the call center 132 may be semi-automated with operators or agents inputting at least some purchase information into a computer (represented by the call center 134) or like device. In a further form, the call center 134 may be strictly a voice system where operators enter information directly from the consumer.

If the call center 134, acts strictly as a gatherer of purchase transaction information, the central office 120 then takes the purchase transaction information received through the network 118 and produces an electronically formatted transaction record. The electronic record may then be processed further into an electronic receipt and stored in the central office 120 for transmission to various parties, including the consumer.

With the advent of commercial online services and the Internet 138, a personal computer (PC) 128 having a modem may also serve as the point-of-sale device, with the retail terminal being either the call center 134, which is equipped to receive e-commerce transactions via the POTS 130, or the central office 120, which is equipped to receive e-commerce transactions, via an Internet service provider (ISP) 136. Purchase information gathered by the call center 134 or the central office 120 produces transaction data for the purchase initiated by the PC 128. Either the call center 134 or the central office 120 may generate the electronically formatted receipt from the transaction data obtained from the PC 128.

In the in-home shopping environment, the consumer is provided some mechanism to browse products. Catalog retailing 124 provides the physical catalog that contains product information and pricing. Television based retailing 126 provides broadcast of product information and pricing on which a consumer can make a purchase decision. The consumer then uses the telephone 122 to contact a call center 134 to place the order. A personal digital assistant (PDA) 130 may also be used as a the point-of-sale device with the call center 134 or the central office 120 as the retail terminal. As with the telephone and the PC 128, the consumer places an order with the call center 134 through the POTS 132. An electronically formatted receipt is generated by the call center 134 or the central office 120 as indicated above, with transaction data gathered by the call center 134.

With in-home shopping 104, the call center 134, or the central office 120 via the call center 134 and the intranet 118 or the ISP 136 and the Internet 138, becomes the retail terminal that provides the processing and/or the formatting of the transaction data as indicated above with respect to the retail premises shopping 102.

Service providers, such as hotels, rental car agencies, home services, and the like, generally designated 106, may also use point-of-sale devices such as a PC 140. The PC 140 may also constitute a retail terminal that gathers purchase transaction data and which generates an electronically formatted record or receipt of the service purchase transaction from the transaction data. The PC 140 is typically coupled to a network, such as the Internet 138 via an ISP 142, in order to transmit the electronically formatted transaction record or receipt to its intended recipient. In one form, the intended recipient is a collection center or data warehouse, such as a central office 120, or directly to the consumer's PC 150.

Other types of transactions such as banking services via an automated teller machine (ATM) 144 and the like, generally designated 108, that utilize a network to conduct the transaction, and which generates transaction data, may be in communication with the central office 120 such as via a local area network (LAN) server 146. The ATM 144 or other machine may produce an electronically formatted transaction record or receipt from the gathered transaction data, or may allow the central office 120 to generate the electronically formatted transaction receipt from the transaction data transmitted to it.

It should be appreciated that the central office 120 may also serve as a purchase transaction data collection center or purchase transaction data warehouse. The central office 120 typically serves as a distribution or transmission point once a digital receipt has been generated.

In all of the above cases, i.e. retail premises shopping 102, in-home shopping 104, service providing 106, and ATM/other 108, transaction data and/or purchase transaction data is obtained by the point-of-sale device, the retail terminal, or a combination of both, from which is generated an electronically formatted transaction record or receipt for storage and/or transmission over a network to which it is connected, then transmitted. As well, in accordance with an aspect of the present invention variously stored and/or generated attachments, files and the like are correlated to certain transaction datum of the transaction data of the digital receipt. Additionally, forwarding profiles and/or addresses are maintained for transmitting at least selective data from a digital receipt, if not the entire digital receipt, to specific entities.

The electronically formatted transaction record may be characterized as a digital receipt. In its electronically formatted (or digital) form, the transaction receipt may be transmitted over a network, or over various networked networks, to any device in communication with the network and adapted to receive such electronically formatted documents. Formatting and/or encoding of the transaction receipt may take many forms, of which many are known. The retail terminal may allow a consumer the option of specifying the type of formatting or encoding for the digital receipt in order to be compatible with the type of viewing program on the consumer's networked device (e.g. PC).

Figure 4:
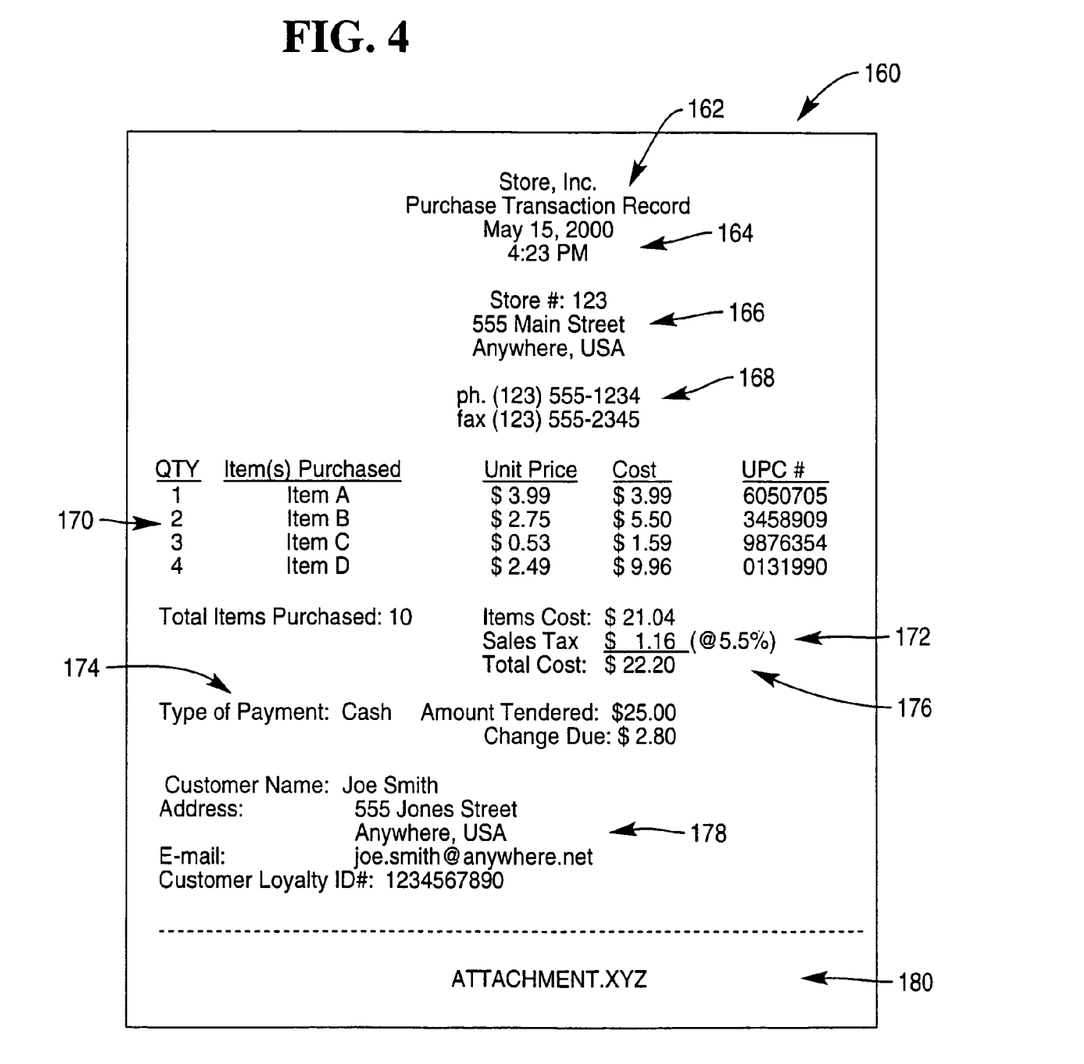
FIG. 4 is a representation of an electronic receipt generated in accordance with the principles of the present invention.

With reference to FIG. 4, an exemplary digital receipt in accordance with the principles of the present invention and in human readable form is shown, generally designated 160. The digital receipt 160 depicts the type of information that is obtained and/or generated during the purchase transaction (i.e. transaction data) and which may be included in the purchase receipt. The information included in the digital receipt 160 may be included in a paper receipt, if one is produced, for the transaction.

The digital receipt 160 may include the name of the merchant, retailer, store, or type of business and/or the like 162 (collectively "store") and the time and date 164. The digital receipt 160 may include a header that identifies itself, here "Purchase Transaction Record." Store particulars 166 may also be included such as store number, street address (i.e. location), telephone and facsimile numbers. A product and/or service area 170 is provided that details the type of product, item or service (collectively 'item") purchased (either by full item name or by a truncated item name), the quantity of each item purchased, the unit price of the item, total cost of each quantity of item(s), the universal product code (UPC) or other identifier for the item, and a total number of items purchased. A costing area 172 includes the total cost of all items, a tax paid/data area 176, and a total customer cost. The receipt 160 further contains a payment area 174 that includes the mode or method of payment used by the consumer (i.e. cash, check, credit card, debit card, etc.). If necessary, an amount tendered area and change due area are also included.

It should be appreciated that the transaction data or information shown on the digital receipt 160 is only exemplary of the many pieces of transaction datum that is obtained/generated by or during the purchase transaction. The structure, layout, and/or form of the digital receipt 160 is also only exemplary. The digital receipt is electronically formatted transaction data (i.e. compilation of transaction datum) that may be compiled, combined and/or assembled in various ways.

In accordance with an aspect of the present invention, the digital receipt 160 includes an attachment 180 that is formatted for electronic transmission over the network along with or appended to the digital receipt 160. The attachment may take many forms as is detailed below and be electronically formatted by various encoding methods. The attachment 180 may be stored in the retail terminal on which the purchase transaction transpired, or may be stored in the central office 120 to which the digital receipt 160 is transmitted from the retail terminal or on which the digital receipt 160 is compiled and formatted for transmission in the case that the retail terminal does not do so.

In accordance with one aspect of the present invention, the attachment 180 is correlated to at least one of the purchased items. Such correlation may be accomplished by the retail terminal on which the purchase transaction transpired, or by the central office 120. The choice as to which item to make the correlation may depend on several factors is not necessarily relevant. Various business reasons may favor the correlation to one item over another item depending on the nature of the attachment. Regardless, after the correlation is established and the attachment is chosen and appended to the digital receipt 160, the central office 120 transmits the digital receipt 160 and attachment 180 over the network as an integrated digital receipt.

Referring to FIG. 1, the central office 120 may transmit the integrated digital receipt over the Internet 138 (i.e. network) to the consumer's PC 150, a third party's PC 152, and/or a government/agency's PC 148 depending on the nature of the transaction. PCs and other network enabled devices in other locations may also receive the digital receipt depending on the nature of the transaction. As explained further below, transaction datum of the transaction data from the digital receipt may be selectively transmitted with the digital receipt or omitted therefrom. This, again, depends on the nature and/or characterization of the purchase transaction. The e-mail address or otherwise of the particular PC or network enabled device may be stored by the retail terminal or central office, or may be obtained as part of the purchase transaction. This, again, depends on the nature of the purchase transaction.

Figure 5:
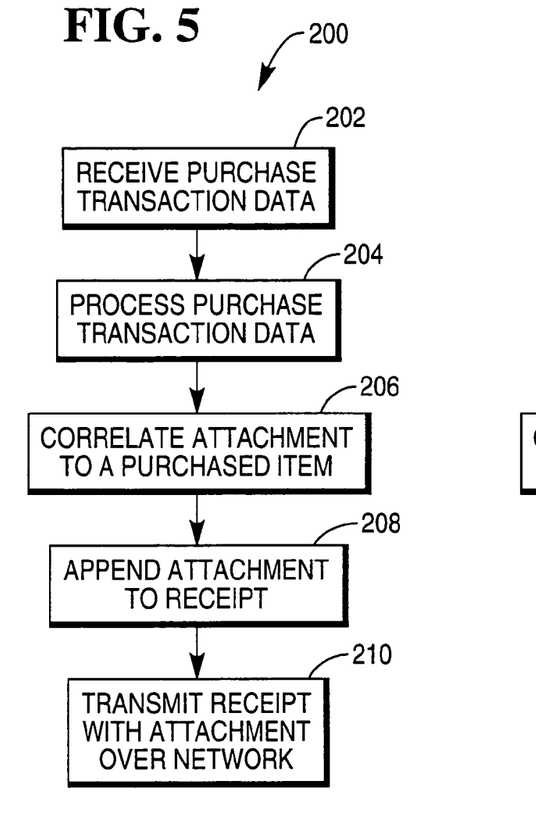
FIG. 5 is a flowchart of a purchase transaction in accordance with one aspect of the present invention.

Referring to FIG. 5, there is depicted a program flow, generally designated 200, for providing an attachment to a digital receipt, with the attachment correlated to a purchased item. Additional reference should be made to FIG. 1. In block 202, a retail terminal (e.g. kiosk 112 or the like) or the central office 120 receives and/or obtains purchase transaction data as a result of a purchase transaction between a consumer and a store. Such purchase transaction data includes the type of item(s) purchased. The purchase transaction data is processed, block 204, which includes formatting the purchase transaction data for transmission over a network as a purchase transaction record or receipt. In block 206, an attachment is correlated to at least one purchased item. Correlation of an attachment to at least one purchased item is accomplished by the retail terminal, the in-store processor 116, or the central office 120, depending on the manner in which the purchase transaction transpired. Various attachments are stored by the retail terminal, in-store processor 116, or central office 120 as the case may be, and indexed for access thereto. The criteria for correlating an attachment to a purchased item may differ depending on the type of attachment. Various types of attachments may be chosen depending on the items purchased. Examples of the various attachments that may be chosen are listed below.

Once an attachment is correlated to a purchased item, the attachment is formatted for transmission over a network and appended to the transaction receipt, block 208. The consumer may have the option of selecting the format for the attachment, depending on the attachment. After the attachment is appended to the transaction receipt, the integral transaction receipt is transmitted over the network 210 to the appropriate destination. Typically, the integral transaction receipt is forwarded from the central office 120 to the consumers PC 150 via the Internet 138.

As indicated above, the attachments may take many forms. One such attachment may be a coupon, offer, or discount (collectively "coupon") for future use on a same or similar item to the purchased item to which the coupon (attachment) was correlated. The coupon would be printable by the consumer for later use. Various authenticating/validation means may be utilized to ensure that the coupon is legitimate.

Another type of attachment may be a user's manual for the purchased item. The user's manual may be stored on the in-store processor 116 or the central office 120, or may be stored on a third party's PC 152 (see FIG. 1), such as a manufacturer's PC. The central office 120 would recognize that an item purchased needed a user's manual and obtain the same from the third party's PC 152 via the Internet 138 (or dedicated network connection) and append the user's manual to the digital receipt for transmission to the purchaser.

A serial number may also be an attachment for the purchased item. Like the user's manual, the serial number may be stored on the in-store processor 116 or the central office 120, or may be stored on a third party's PC 152 (see FIG. 1), such as a manufacturer's PC. The central office 120 would recognize that an item purchased needed a user's manual and obtain the same from the third party's PC 152 via the Internet 138 (or dedicated network connection) and append the serial number to the digital receipt for transmission to the purchaser.

In addition to any of the above attachments, another attachment may be a form able to be electronically completed by a consumer and electronically forwarded, such as by a network or disk, to the manufacturer of the purchased item. The form would be formatted for transmission over the network and then appended to the digital receipt. A warranty or rebate application are examples of such forms. Again, the form may be stored on the in-store processor 116 or the central office 120, or may be stored on a third party's PC 152 (see FIG. 1), such as a manufacturer's PC. The central office 120 would recognize that an item purchased needed a particular form and obtain the same from the third party's PC 152 via the Internet 138 (or dedicated network connection) and append the serial number to the digital receipt for transmission to the purchaser.

A still further type of attachment that can be correlated to an item purchased is a hyperlink to a retailer's Internet site from which the purchased item was acquired or to a manufacturer who manufactured the purchased item. Again, the hyperlink would allow the recipient of the digital receipt to have their network browser go directly to the URL (uniform resource locator) of the retailer or manufacturer or other page of the Internet site.

A yet further type of attachment that can be correlated to an item purchased is a multi-media file that advertises the retailer from which the purchased item was acquired or the item manufacturer. The multi-media file may includes an instruction manual or the like for the item. Again, the multi-media file may be stored on the in-store processor 116, the central office 120, or on a third party site.

Other attachments that can be correlated to a purchased item include a frequent shopper report or a software application. In all cases, though, the attachment is indexed such as to specific items so that the purchase of those items triggers the attachment being appended to the formatted transaction data. Other correlation factors may be applied to access the indexed attachments.

It should as well be appreciated, that there may be more than one attachment appended to the formatted transaction data depending on the items purchased. For instance, if there were several items purchased that need user's manuals, warranties, serial numbers, or the like, an attachment or attachments would be appended to the digital receipt for each item.

In accordance with another aspect of the present invention, the attachment is correlated to the payment method or mode used by the purchaser of the item (i.e. the consumer). The manner of payment, i.e. cash, credit, check, debit, or otherwise, is utilized to choose an attachment and append that attachment to the formatted transaction data.

Figure 6:
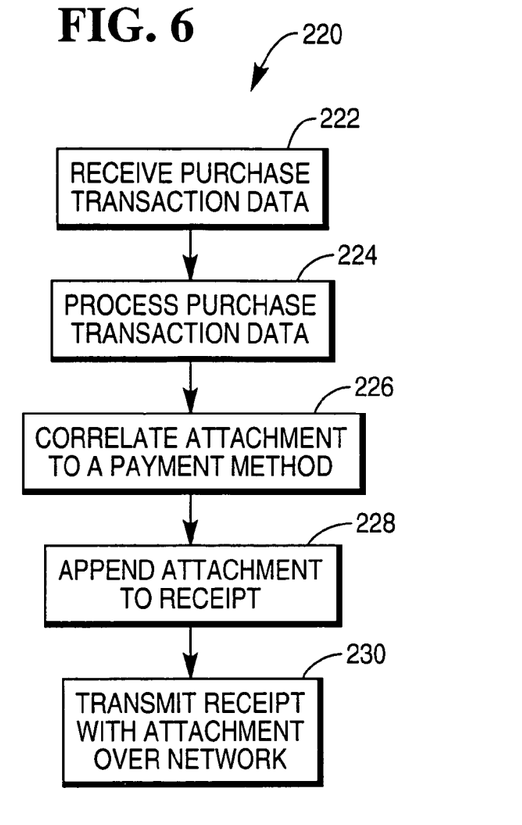
FIG. 6 is a flowchart of a purchase transaction in accordance with another aspect of the present invention.

Referring to FIG. 6, there is depicted a program flow, generally designated 220, for providing an attachment to a digital receipt, with the attachment correlated to the payment mode utilized to acquire an item. Additional reference should be made to FIG. 1. In block 222, a retail terminal (e.g. kiosk 112 or the like) or the central office 120 receives and/or obtains purchase transaction data as a result of a purchase transaction between a consumer and a store. The purchase transaction data includes the payment method or mode utilized by the purchaser. The purchase transaction data is processed, block 224, which includes formatting the purchase transaction data for transmission over a network as a purchase transaction record or receipt. In block 226, an attachment is correlated to the payment method utilized by the consumer. Correlation of an attachment to the payment mode is accomplished by the retail terminal, the in-store processor 116, or the central office 120, depending on the manner in which the purchase transaction transpired.

If the payment method is one which requires a signature, the signature may be captured (e.g. digitized) as is known in the art and used as the attachment. If the payment method is the tendering of a check, an image of the check may be captured (e.g. digitized) as is known in the art and used as the attachment. The attachment might encompass a previously captured signature for the purchase transaction, and appending the previously captured signature to the formatted transaction data.

Once an attachment is correlated to the payment mode, the attachment is formatted for transmission over a network and appended to the transaction receipt, block 228. The consumer may have the option of selecting the format for the attachment, depending on the attachment. After the attachment is appended to the transaction receipt, the integral transaction receipt is transmitted over the network 230 to the appropriate destination. Typically, the integral transaction receipt is forwarded from the central office 120 to the consumers PC 150 via the Internet 138.

Figure 7:
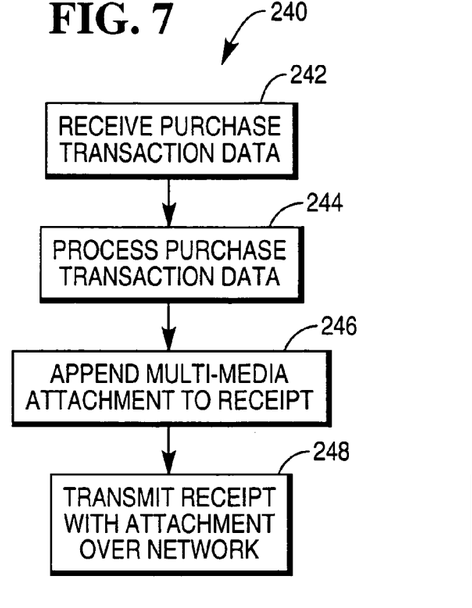
FIG. 7 is a flowchart of a purchase transaction in accordance with yet another aspect of the present invention.

In accordance with another aspect of the present invention, the attachment is a multi-media file for product promotion and/or advertisement. Referring to FIG. 7, there is depicted a program flow, generally designated 240, for providing an attachment to a digital receipt, with the attachment being a multi-media file for product promotion and/or advertisement. Additional reference should be made to FIG. 1. In block 242, a retail terminal (e.g. kiosk 112 or the like) or the central office 120 receives and/or obtains purchase transaction data as a result of a purchase transaction between a consumer and a store. The purchase transaction data is processed, block 244, by formatting the purchase transaction data into a receipt to be transmitted over a network. A multi-media attachment is then appended to the receipt, block 246. The receipt and appended multi-media attachment is then transmitted over the network, block 248, to an appropriate destination.

The multi-media attachment is chosen to provide an advertisement or promotion for a product carried by the merchant who was a party to the purchase transaction. The multi-media attachment may be an advertisement or promotion for a manufacturer of a product similar to one purchased or by a manufacturer whose products are carried by the merchant.

Figure 8:
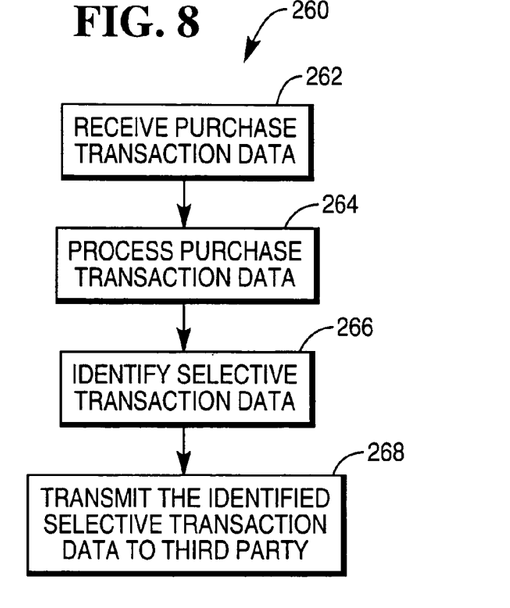
FIG. 8 is a flowchart of a purchase transaction in accordance with still another aspect of the present invention.

In accordance with yet another aspect of the present invention, the digital receipt, or selective datum from the digital receipt is forwarded to a non-party (i.e. a third party) to the purchase transaction. Referring to FIG. 8, there is depicted a program flow, generally designated 260, for providing the digital receipt or a portion of the formatted transaction data from the digital receipt to a third party, the third party having an interest in receiving the data. Additional reference should be made to FIG. 1. In block 262, a retail terminal (e.g. kiosk 112 or the like) or the central office 120 receives and/or obtains purchase transaction data as a result of a purchase transaction between a consumer and a store. The purchase transaction data is processed, block 264, by formatting the purchase transaction data into a receipt to be transmitted over a network. In block 266, certain transaction data is identified by the retail terminal, in-store processor 116, the central office 120, or the like that is to be forwarded by network transmission to a non-party to the purchase transaction. The non-party to the transaction may be a government or government agency 148, or a third party 152 who has a need for the transaction data because of reporting requirements or because of collection requirements.

The identified selective transaction data may be sales tax data that is imposed and thus collected and forwarded (transmitted) to a state government (U.S. state or foreign province or the like) or a federal government (U.S. or other). This may be necessary or be a convenient way to comply with tax collection and/or accounting laws (e.g. fiscalization or audit trail purposes). The selective transaction data may be purchased item data for those consumers paying with food stamps, WIC coupons, or the like. When this type of transaction is identified, the transaction data that correlates to the type of transaction being presented to the retail terminal is transmitted to a federal government (e.g. the U.S. government) or other third party as the case may be. This can help ensure compliance with the federal program.

Once the selective transaction data is identified (block 266), the identified selective transaction data is transmitted to the third party over the network. The network may be a public network such as the Internet 138 or may be a private network that is in communication with the retail terminal, in-store processor 116, central office 120, or the network enabled device that is performing the processing described above.

In accordance with still another aspect of the present invention, the consumer or purchaser is given the option of scheduling the transmission of the digital receipt to the consumer or other intended destination other than a central storage location (i.e. data warehouse). In this manner, the digital receipt may be delayed in transmission for minutes, hours, days, weeks, etc. Such may be useful when an item has been purchased as a gift or for a particular occasion and the recipient of the gift or item may see the digital receipt. The digital receipt would be delivered according to the schedule of the consumer to arrive after the particular occasion or giving of the gift.

Figure 9:
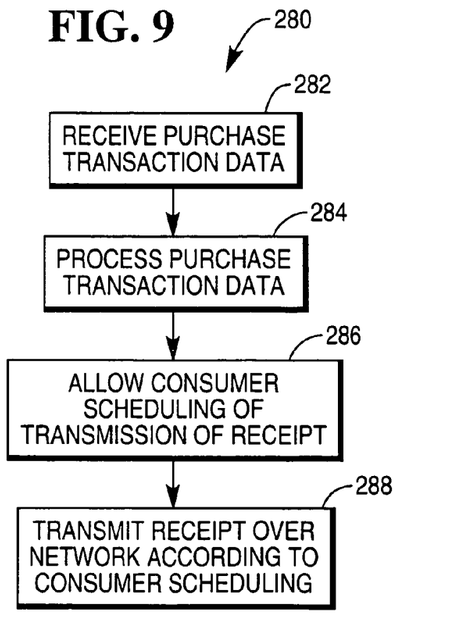
FIG. 9 is a flowchart of a purchase transaction in accordance with an even further aspect of the present invention.

Referring to FIG. 9, there is depicted a program flow, generally designated 280, for allowing the scheduled or delayed transmission of the digital receipt to its intended recipient. Additional reference should be made to FIG. 1. In block 282, a retail terminal (e.g. kiosk 112 or the like) or the central office 120 receives and/or obtains purchase transaction data as a result of a purchase transaction between a consumer and a store. The purchase transaction data is processed, block 284, by formatting the purchase transaction data into a receipt to be transmitted over a network. In block 286, the consumer is allowed the option of scheduling the transmission or forwarding of the digital receipt to its intended recipient. The scheduling option would allow for a delay in transmission of minutes, hours, and days, or possibly not at all. Typically, the intended recipient is the consumer's PC 150, but may be a third party 152 or otherwise. The digital receipt would be transmitted to the central office 120 or other storage location for the merchant according to a normal transmission schedule. Once the consumer has scheduled the transmission of the digital receipt, the digital receipt is transmitted according to the schedule, block 288.

In accordance with a still further aspect of the present invention, the consumer or purchaser is given the option of omitting selective purchase transaction data from the digital receipt before it is transmitted to the consumer or other intended destination other than a central storage location (i.e. a data warehouse). In this manner, privacy concerns may be addressed on the recipient's end.

Figure 10:
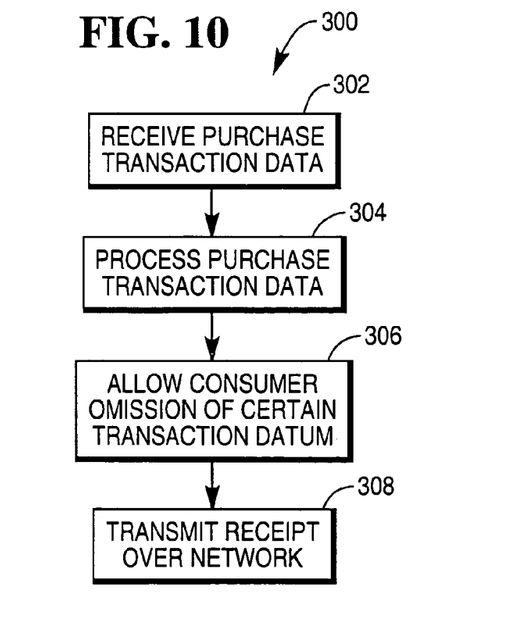
FIG. 10 is a flowchart of a purchase transaction in accordance with a yet even further aspect of the present invention.

Referring to FIG. 10, there is depicted a program flow, generally designated 300, for allowing the omission of select purchase transaction datum of the purchase transaction data of the digital receipt before transmission to the consumer or other intended recipient. Additional reference should be made to FIG. 1. In block 302, a retail terminal (e.g. kiosk 112 or the like) or the central office 120 receives and/or obtains purchase transaction data as a result of a purchase transaction between a consumer and a store. The purchase transaction data is processed, block 304, by formatting the purchase transaction data into a receipt to be transmitted over a network. In block 306, the consumer is allowed the option of omitting or deleting certain transaction datum from the digital receipt. While the consumer is allowed to omit certain transaction datum from the digital receipt that is transmitted to him/her, the digital receipt that is transmitted to the central office 120 or other storage location for the merchant would not omit or delete any of the purchase transaction data. Once the consumer has indicated that certain purchase transaction datum is to be omitted from his/her digital receipt, the digital receipt is transmitted over the network accordingly, block 308.

In accordance with another aspect of the present invention, digital receipts representing the compilation of purchase transaction data obtained as a result of a purchase transaction are collected from a plurality of merchants and stored in a central storage device such as a data warehouse. The digital receipts are indexed, categorized and/or the like by the data warehouse. In this manner, various statistics may be maintained regarding the digital receipts and/or the plurality of transaction datum that make up the various digital receipts. The digital receipts and/or the various transaction datum are accessible by public or private network and through a controlled or restricted gateway in order to preserve privacy and address other concerns.

Figure 11:
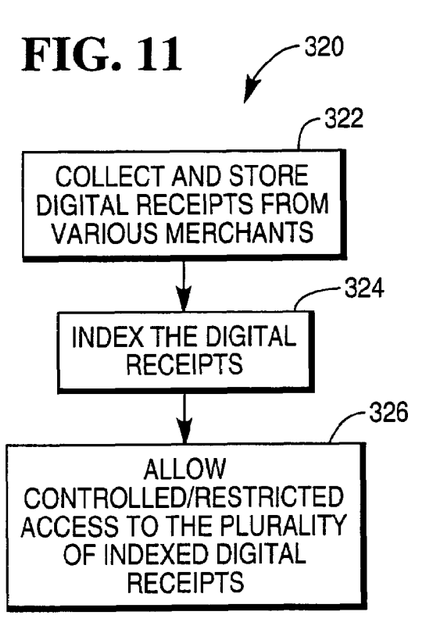
FIG. 11 is a flowchart of a purchase transaction in accordance with a still even further aspect of the present invention.

With reference to FIG. 11, there is depicted a program flow, generally designated 320, of the collection, storage, and dissemination of a plurality of digital receipts from a plurality of different merchants. Additional reference should be made to FIG. 1. Initially, a plurality of digital receipts is collected from a plurality of different merchants, block 322. The plurality of digital receipts are collected by the central office 120, data warehouse, or the like that is in communication with the in-store processors, central offices, or retail terminals via the Internet 138 (i.e. a public network) or a private network. As the purchase transactions transpire, the purchase transaction data are processed into digital receipts and transmitted to the central office/data warehouse 120 over the Internet 138. The central office/data warehouse indexes and/or databases each digital receipt as well as the individual purchase transaction datum, block 324. Access to the indexed purchase transaction data is allowed, block 326 on a controlled/restricted basis such as by subscription.

In accordance with a yet another aspect of the present invention, a digital receipt, generated as a result of a purchase transaction, includes a bar code or other scanable representation that encodes an embedded identifier. The bar code allows the recalling of the purchase transaction (i.e. digital receipt) from a central storage device/database via any scanner that is in communication with the central storage location. The digital receipt has been previously transmitted to the central storage location by the retail terminal on which the purchase transaction transpired. The embedded identifier may be encoded to authenticate or validate the holder once the digital receipt has been printed and taken to a scanning location.

Figure 12:
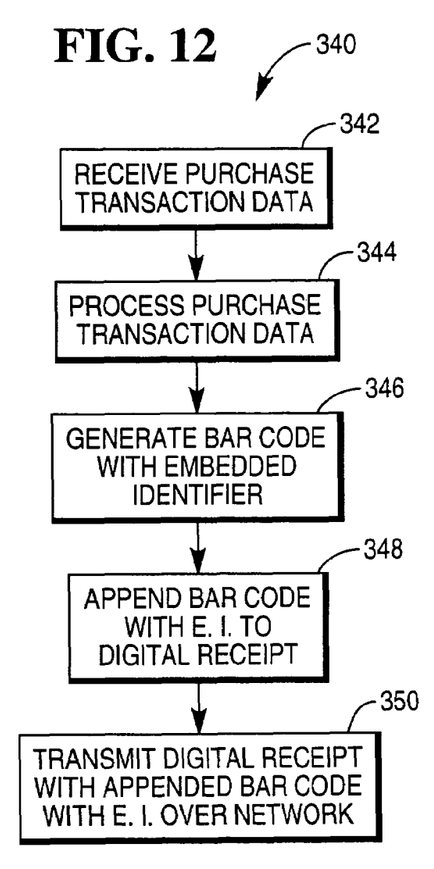
FIG. 12 is a flowchart of a purchase transaction in accordance with another further aspect of the present invention.

With reference to FIG. 12, there is depicted a program flow, generally designated 340, of the encoding of a digital receipt. Additional reference should be made to FIG. 1. In block 342, a retail terminal (e.g. kiosk 112 or the like) or the central office 120 receives and/or obtains purchase transaction data as a result of a purchase transaction between a consumer and a store. The purchase transaction data is processed, block 344, by formatting the purchase transaction data into an electronic or digital receipt to be transmitted over a network. After the digital receipt has been produced, a bar code or other mark having an embedded and/or encoded identifier is generated, block 346. The generated bar code with the embedded identifier is then appended to the digital receipt, block 348, and then transmitted over a network, block 350. The digital receipt is typically transmitted to the consumer who made the purchase and the to merchant who made the sale.

In one form, the embedded identifier is an e-mail address or URL to the networked central storage location for recall of the purchase transaction. Other identifiers for various purposes may also be generated and appended to the digital receipt.

It should be appreciated that the various aspects of the present invention discussed above may be combined with one another to produce any desired result. For instance, any digital receipt for which a correlated attachment has been appended thereto may be scheduled for transmission or forwarding by the consumer. In another instance, various transaction datum may be omitted from a transmission scheduled digital receipt or one in which an attachment has been correlated thereto.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of processing a purchase transaction on a retail terminal, comprising the steps of:
    acquiring purchase transaction data including item identification information of purchased items and payment information for paying for the items by a processor of a retail terminal of a merchant as a result of a purchase transaction being performed on the retail terminal, wherein the processor communicates with a number of peripherals coupled to the processor via corresponding communication lines including a display, an input device, a printer, a barcode reader, and a card reader;
    formatting the acquired purchase transaction data into a digital receipt by the processor;
    receiving input from a person at the retail terminal that selectively identifies purchase transaction datum for omission from the digital receipt by the processor;
    selectively omitting the identified purchase transaction datum from the digital receipt to generate a personalized digital receipt by the processor;
    forwarding the personalized digital receipt by the processor over a network that is in communication with the processor to a personal computer operated by the person who identified the purchase transaction datum for omission from the digital receipt; and
    transmitting the digital receipt over the network to a storage location for the merchant by the processor.

2. The method of claim 1, further comprising the step of:
    identifying the device to which the personalized digital receipt is forwarded with data from the purchase transaction data by the processor.

3. The method of claim 1, further comprising the step of:
    activating the printer to generate a human readable hard copy of the personalized digital receipt by the processor.

4. A method of processing a purchase transaction on a retail terminal, comprising the steps of:
    acquiring purchase transaction data including item identification information of purchased items and payment information for paying for the items by a processor of a retail terminal of a merchant as a result of a purchase transaction being performed on the retail terminal, wherein the processor communicates with a number of peripherals coupled to the processor via corresponding communication lines including a display, an input device, a printer, a barcode reader, and a card reader;

generating a digital receipt with the purchase transaction data by the processor;

receiving input from a person at the retail terminal by the processor, the received data being used to select purchase transaction datum for omission from the digital receipt;

deleting the selected purchase transaction datum from the digital receipt to generate a personalized digital receipt by the processor;

transmitting the personalized digital receipt over a network that is coupled to the processor to a personal computer operated by the person who used the retail terminal to select purchase transaction datum for omission from the digital receipt; and transmitting the digital receipt over the network to a storage location for the merchant by the processor.

5. The method of claim 4 further comprising:

identifying the device to which the personalized digital receipt is transmitted with data from the purchase transaction data by the processor.

6. The method of claim 4, further comprising the step of:

activating the printer to generate a human readable hard copy of the personalized digital receipt by the processor.

* * * * *